June 24, 1930.  W. J. CROWELL, JR  1,766,981
AUTOMATIC REACTION CONTROL
Filed Dec. 21, 1925  3 Sheets-Sheet 1

Witnesses:
Robert C. Crowell
Wm. J. Crowell 3rd

Wm. J. Crowell Jr.
Inventor.

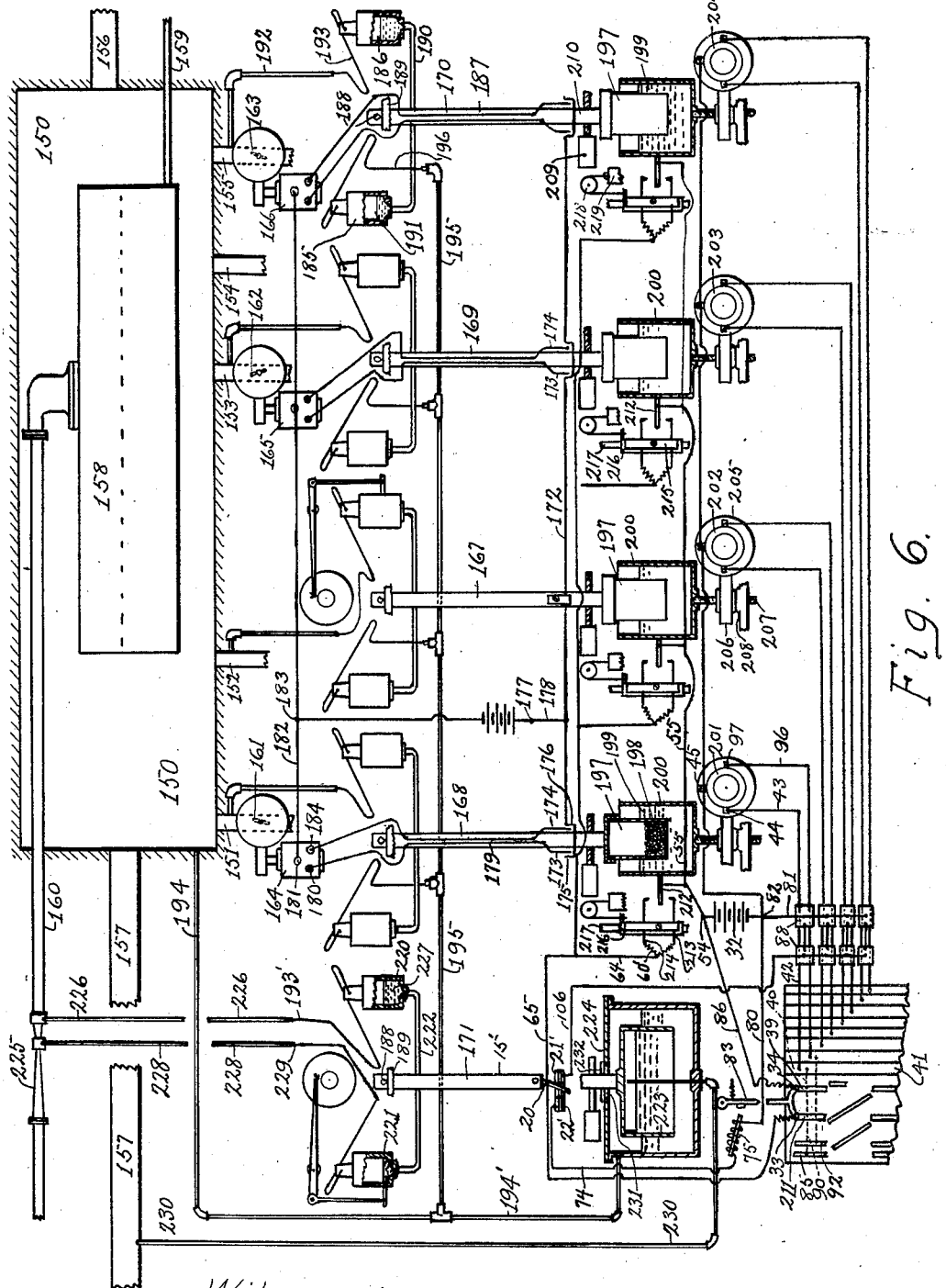

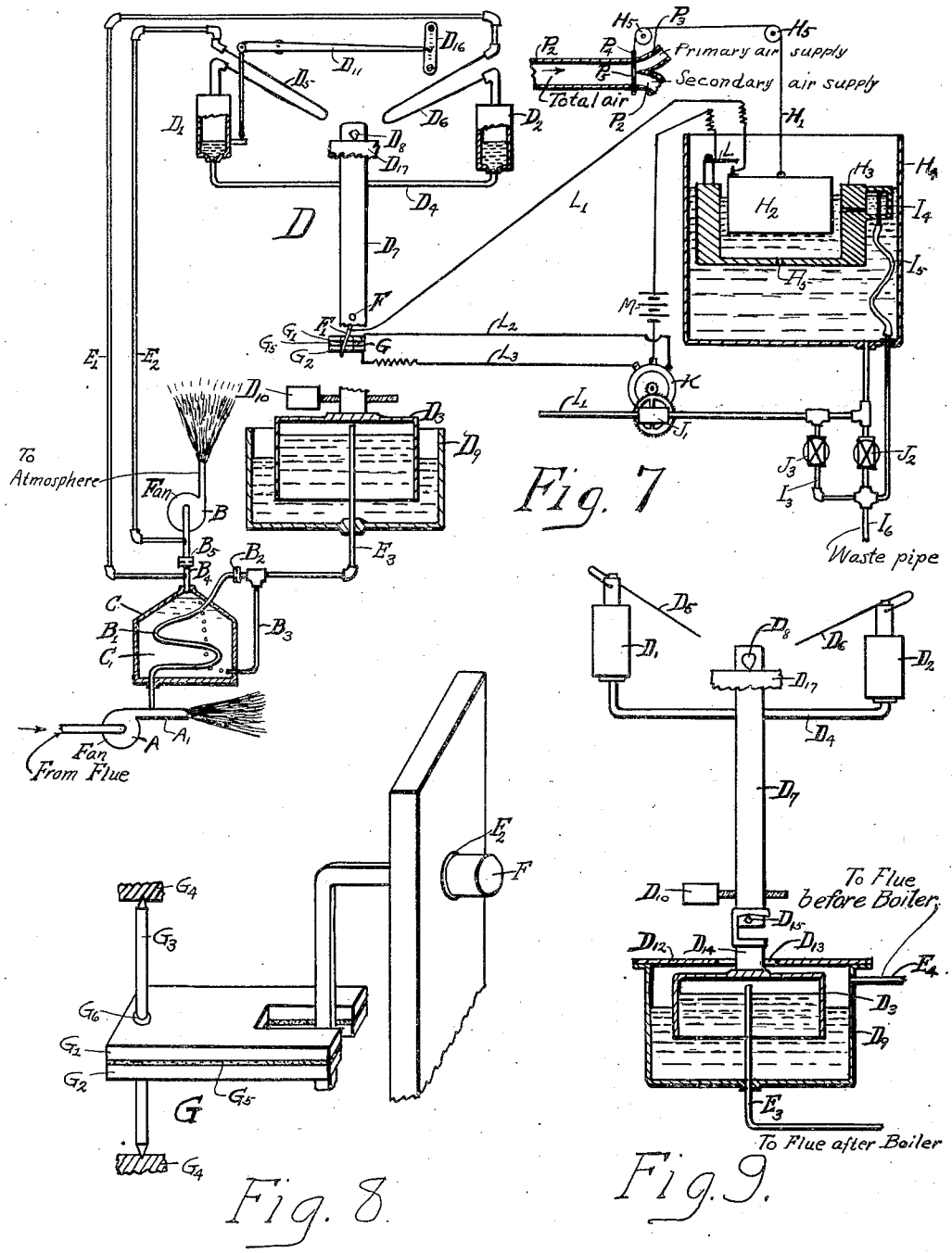

Patented June 24, 1930

1,766,981

UNITED STATES PATENT OFFICE

WILLIAM J. CROWELL, JR., OF WYNCOTE, PENNSYLVANIA

AUTOMATIC REACTION CONTROL

Application filed December 21, 1925. Serial No. 76,845.

My invention relates to methods and apparatus for obtaining an automatic experimental adjustment of a continuing reaction whether chemical or physical, produced when two or more component streams of fluid come together and inter-react.

A purpose of my invention is to automatically control the size of one or more component streams before they react, and periodically to make automatically an experimental change in the size of one of the flows in order to determine the direction for a permanent adjustment to improve the reaction, and then automatically to gradually make the permanent adjustment indicated until the reaction conditions cease to improve, preferably ending with an adjustable small reverse adjustment to correct overtravel.

A further purpose is to operate in this way successively upon different component streams, operating on one stream at a time, making initially an experimental change in the size of one of the streams to determine the direction for a permanent adjustment to improve reaction conditions, slowly making such permanent adjustment to a point at which the reaction no longer improves, adjustably reversing somewhat at the end to correct overtravel, waiting a while and then proceeding with one of the other streams.

A further purpose is to do this periodically and automatically over and over, successively on the different streams, if desired or upon one alone at periodic intervals if such conditions make this better.

A further purpose is to impress a deflecting moment upon a differential balance by means of differential pressure and to automatically vary the restoring moment upon the balance in order to vary the ratio between deflection and differential pressure the balance.

A further purpose is to maintain a component stream in correct variant relation with one or more other streams by impressing differentials from the respective streams upon respective differential balances, having the balances deflect in substantial unison under automatic adjustment of one or more of the streams and then automatically and variantly adjusting the deflection factor or factors of one or more of the balances.

The deflection factor for any balance may be taken as the ratio of its angular deflection to the impressed differential producing the deflection.

Further purposes will appear in the specification and in the claims.

In this application I have selected for illustration a few form only of my invention the differences illustrated being chiefly in details that could be widely varied. The forms selected are adapted to efficient operation, easy and inexpensive installation, and well illustrate the principles involved.

Figure 1:
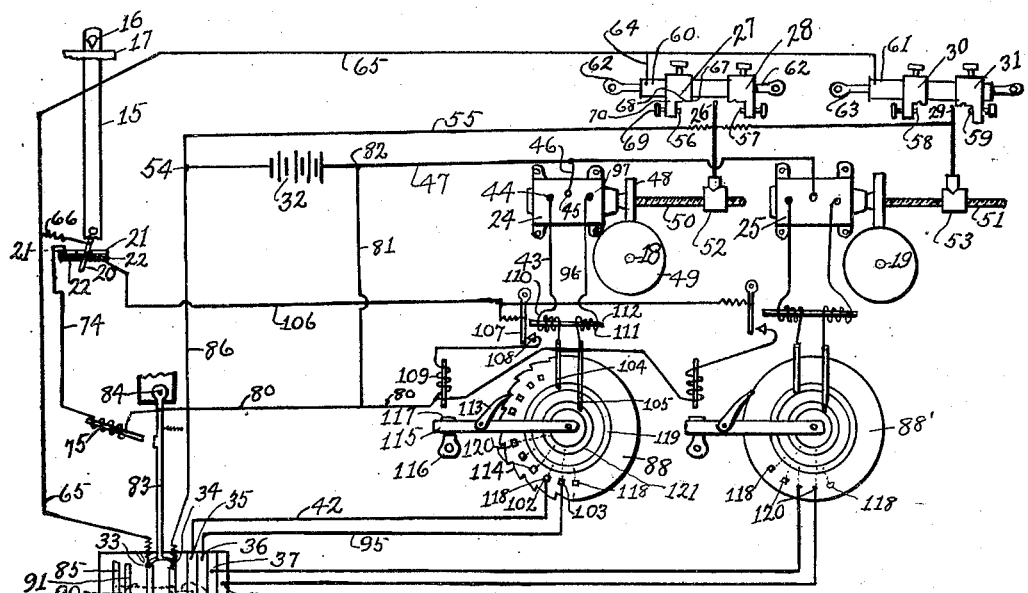
Figure 1 is a diagrammatic assembly view showing schematically my invention as applied to control a hypothetical reaction that may be of widely variant nature.
Figure 4:
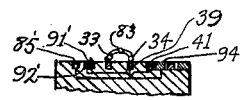
Figure 5:

Figures 4 and 5 are fragmentary detail sections taken upon the lines 4—4 and 5—5 respectively of Figure 1.

Figure 6 is a diagrammatic view illustrating a desirable combination between the automatic experimental cut and try adjustment of Figure 1 and my master and subordinate differential balances. The balances here maintain a number of component flows proportional in magnitude to the same function of the deflection of a master balance and therefore to a flow to which the master balance is responsive, with automatic successive experimental adjustments in the ratio of each subordinate flow to the master flow to improve reaction conditions.

Figure 7 is a diagrammatic view illustrating one form of my invention applied to automatic adjustment in conditions of combustion, the major balance being shown responsive to the chemical composition of the flue gas.

Figure 8 is a perspective view to enlarged scale of a portion of the structure of Figure 7.

Figure 9 illustrates somewhat diagrammatically a form of major differential ratio balance somewhat different from that shown in Figures 6 and 7 adapted to move responsively to boiler efficiency, so that each experimental adjustment may be directed toward increasing boiler efficiency.

Like numerals refer to like parts in all figures.

Describing in illustration and not in limitation and referring to the drawings:—

Describing the structure shown diagrammatically in Figure 1.

A member 15 pivoted at 16 upon suitable bearing 17 is in any suitable way (not shown) connected to deflect variantly responsively to different positions of the valves 18 and 19.

The deflection or angular position of the pivoted arm member 15 measures any desirable condition that is adapted to be changed or adjusted by adjustment of the valves 18 and 19, and this member 15 hereinafter called a reaction meter may be the deflecting element of any instrument, as thermometer, ratio meter, pressure gauge, flow-meter, etc. that may measure a desirable condition incident to proper adjustment of valves 18 and 19.

The deflecting member 15 by means of its angularly adjustable contact member 20, movable contact members 21 and 22, commutator 23, reversible motors 24 and 25, contacts 26, 27, 28 and 29, 30, 31, source 32 of electric energy and suitable electrical connections makes periodic successive adjustments in the valves.

The commutator 23 is shown diagrammatically, the circumfertial developed surface being shown to make it possible to show all connections. The arrows indicate the direction of motion of the surface with respect to the brushes 33, 34, 35, 36, 37 and 38. This commutator is driven preferably continuously by any suitable clock or other motor, not shown.

When the commutator has moved to position shown in Figure 1 the motor 24 is automatically started by reason of current from the source 32 to the brush 34, commutator contact member 39, commutator conductor 40, commutator ring 41, brush 35, wire connections 42 and 43 to the left-hand terminal 44 of the motor, the return circuit being through the terminal 45, conductors 46 and 47 to the source.

As the commutator gradually rotates the motor 24 slowly changes the position of the valve 18 by means of the worm 48 mounted upon the shaft of the motor and worm wheel 49 upon the stem of the valve.

In the diagrammatic indication the extended shafts 50 and 51 of the motors 24 and 25 respectively are threaded to carry nuts 52 and 53 which move longitudinally along the extended threaded portions of the respective shafts according to the direction of rotation of the respective motors.

Contact members 26 and 29 carried by the nuts 52 and 53 are electrically connected to the left-hand terminal 54 of the source of electrical energy through a wire 55 and extend upwardly between spaced contact points 56, 57 and 58, 59 respectively carried upon contact sleeves 60 and 61 that are adapted to be slid along stationary rods 62 and 63.

The sleeves 60 and 61 are electrically connected through connections 64, 65 and 66 to the contact member 20 carried by the deflecting arm 15 of the instrument that is variably responsive to varying positions of the valves 18 and 19.

The contact member 26 extending upwardly from the nut 52 is conveniently a flat spring. As the nut 52 moves along the shaft 50 the upper end of the spring contact member 26 engages the contact point 56 if moving in one direction or the contact point 57 if moving in the other direction.

With continuing motion of the nut, the spring contact member after deflecting somewhat to gather force pushes the sleeve 60 ahead of it along the rod 62, and as a result of the deflection the nut will have to travel somewhat in reverse direction to break contact between the contact members 21 and 26.

The members 27 and 28 are shown as outer sleeves adjustably spaced along the sleeve 60 to which they are rigidly fastened, the space between these members determining the distance the valve is moved for orientation; orientation is during the initial gradual change in the position of the valve for the purpose of determining the direction for a permanent adjustment.

The required length of movement for orienting purposes will vary with circumstance, so that it is quite desirable to make the length of this movement adjustable as above.

The extent of reverse movement of the nut 52 required to open contact between members 27 and 26 is preferably made adjustable and Figure 1 illustrates one of many ways for doing this.

The spring contact member 26 is slightly longer than that required to just reach the bottom of the sleeve 27 so that after the upper end of the member 26 engages the bottom corner 67 of the collar member 27 the member 26 has to bow slightly before its upper end begins to slide along the bottom of the collar member.

A notch 68 is shown somewhat in from the corner 67. The purpose of this notch is to permit easy reverse bowing of the contact member 26 when it moves in reverse direction to open contact with the member 27 and thereby to insure a definite break when the upper end of the member 26 in its return movement passes the corner 67.

When this takes place the upper end of the member 26 springs away definitely from the member 27 on passing the corner 67, which is desirable though not essential.

The member 27 carries a screw 69 upon a downwardly extending lug 70 of the member 27 to adjustably limit the motion of the top of the member 26 along the bottom of the member 27 or more correctly to adjust the distance the nut 52 must travel backwardly after pushing along the sleeve 60 before contact opens between the members 26 and 27.

The contact member 20 carried upon the arm 15 of the responsive instrument is shown angularly adjustable with respect to the arm 15 and therefore with respect to opposing parallel faces 71 and 72 of a slot in the composite contact member 73 which co-operates with the contact member 20 carried by the arm. The contact member 20 operates between the faces 71 and 72 and is adapted to engage one or other of these faces according to the direction of movement of the balance.

The composite contact member 73 comprises upper and lower contacts 21 and 22 respectively, electrically insulated and slotted to pass the cooperating contact 20 on the arm 15. It is shown in perspective in Figure 8. It is neutral as to position, moving freely in either direction to accommodate changes in the angular position of the arm 15 by engagement between the contact member 20 and the cooperating contacts 21 and 22.

Figure 3:
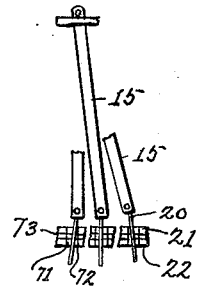
Figure 3 is a fragmentary view showing a detail of Figure 1 in different positions that correspond to different conditions of reaction. This figure illustrates electrical connections set for an automatic gravitational adjustment of the relative sizes of component flows, by suitable automatic adjustment of valves, to produce a desired condition of reaction.

Figure 3 shows the relation between co-operating contact members 21 and 22 for different positions of deflection.

Figure 2:
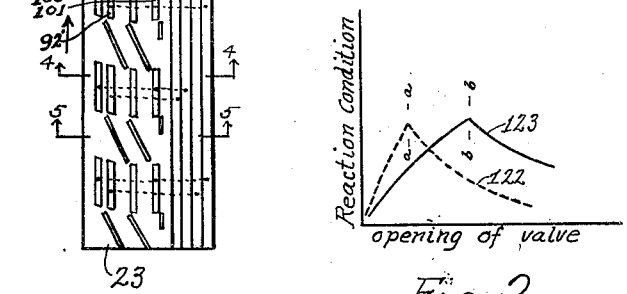
Figure 2 is a hypothetical diagram between a desirable "condition or reaction" and the degree of opening of a valve and is shown to illustrate that the most desirable reaction condition may correspond at different times to different positions of the valve.

When the adjustable member 20 is parallel to the opposing faces 71, 72 of the member 73, as shown in the central position of Figure 2, the adjustable member will engage both upper and lower contact members 21 and 22 if moved in either direction, but if the arm is further to the left, the contact member 20 will engage the lower contact member 22 if the deflection is toward the left and the upper contact member 21 if it is toward the right.

If the arm is to the right, then the reverse is true, that is, the adjustable contact member 20 will engage the upper contact 21 if the deflection is to the left and will engage the lower contact member 22 if the deflection is to the right.

As a result of this the adjustable contact 20 may be set parallel to the vertical opposing faces 71 and 72 when the angular deflection of the arm 15 is that which corresponds to the desired conditions to be produced by proper adjustment of the valves 18 and 19.

When this has been done the valves are automatically adjusted so that every adjustment is in a direction to bring the deflection of the arm 15 of the responsive instrument more near to its best deflection.

If the arm is for example responsive to the content of $CO_2$ in flue gas as from varying the relative quantities of primary and secondary air, and the adjustable contact member 20 is set so as to be parallel with the vertical contact faces 71 and 72 when the $CO_2$ content of the flue gas is 14%, then every automatic adjustment of the valves will be in a direction to make the arm deflect more near to the position corresponding to 14%.

If the $CO_2$ content were below 14% then the adjustment will be such as to raise the content toward 14%, while if the content is above 14% then the automatic change in the position of the valve will be such as to bring the $CO_2$ content down toward 14%.

*Commutator*

The commutator is shown diagrammatically in circumferential development of the external surface. As shown in Figure 1 it operates on the two-motor valve units, alternately over and over. With slight modifications it may operate over and over upon a single motor-valve unit, or upon as many motor-valve units as desired, successively, one after the other and over and over as often as desired.

Each cycle begins with a period during which the motor operates upon its valve, changing the valve position, wholly independently of the conditions at the deflecting arm 15, which moves responsively to reaction conditions.

In this initial period current is flowing through one of the motors to gradually change the position of its valve.

When the period starts the upper end of the spring-contact member 26 is near but definitely spaced from one of the contact members 27 or 28. The direction of the motor is such as to move the nut 52 to carry the contact member 26 away from its adjacent member 27 or 28 and the nut 52 carries the contact member 26 across the adjustable space necessary for it to reach the more distant contact member 28 or 27, for purposes of illustration assumed here to be the member 27.

Until the upper end of the contact member 26 engages the corner 67 of the contact 27 the position and direction of movement of the deflecting arm 15 are wholly without effect upon conditions at the motor 24.

This initial time is one for orienting the automatic adjustment and during it reaction conditions gradualy change due to the gradual change in the position of the valve 18 and by the end of the period for orientation the arm 15 is moving responsively to the changing reaction conditions.

If this motion of the arm 15 is such as to make contact between the contacts 20 and 21 as illustrated in Figure 1 then a circuit is closed from the left terminal 54 of the source 32 of energy through conducting wire 55 contact members 26 and 27, wires 64, 65 and 66, contacts 20, 21, wire 74, electromagnet and wires 80 and 81 to the right-hand terminal 82 of the source of energy.

When the current thus flows through the electromagnet 75 the pivoted arm 83 carrying brushes 34 and 33 swings to the left upon its pivot 84, stopping against the armature of the magnet 75. In the new position the brush 33 is bearing upon the commutator contact member 85 which is in electric connection with the ring 41. The brush 34, at this time, engages a portion of the commutator that is electrically insulated.

The electric connections to the motor are now in the same direction as before, due to the fact that the direction of movement of the arm 15 produced by the orienting change in the position of the valve 18 was such as to indicate that the valve should be moved further in the same direction in order to make reaction conditions still better.

The motor circuit was initially from the left-hand terminal 54 of the source 32 of energy through the wire 86 to the brush 34, commutator contact 39, commutator wire 40, commutator ring 41, brush 35, wire 42, reversing switch 88 wire 43 to the motor terminal 44 and back to the right-hand terminal 82 of the source of energy through electrical wires 46 and 47.

After the contact member 26 engages the contact member 27, closing circuit through the contacts 20 and 21 at the arm 15 and through the electromagnet 75 to throw the arm 83 to the left, the motor circuit is substantially the same as before with the exception that the current from the left-hand terminal of the source of energy has to pass through the conductor 55 contacts 26 and 27, wires 64 and 65, brush 33, commutator contact 85 communtator conductor 90 in order to reach the same commutator ring 41 as before.

As a result the motor continues to move in the same direction and the valve continues to be adjusted in the same direction as before.

As long as conditions continue to improve this slow change in the position of the valve 18 will continue in the same direction but as soon as conditions cease to improve the arm 15 will move slightly to the left breaking contact between members 20 and 21 which opens the circuit through the magnet 75. When the magnetic circuit is broken the brush arm 83 swings somewhat to the right, but not back to its initial position being stopped by engagement between the brush 33 and a radial projection 91 at the right-hand side of the commutator contact 92. This leaves the brush 34 still electrically insulated and the brush 33 upon the commutator contact 92 which is electrically connected to the commutator ring 94 through a commutator wire 93.

The ring 94, through brush 36, wire 95, switch 88 and wire 96, connects with the terminal 97 of the motor, operating the motor in reverse direction.

The motor operates in reverse direction until the nut 52 moves sufficiently far to the right to break contact between the members 26 and 27. This results in a small reverse adjustment to take care of overtravel.

The commutator has been all this time continuously moving in the direction of the arrow and after a predetermined period the brushes 33 and 34 engage suitable guides 98 and 99 which guide them back to initial position for engagement with commutator contacts 100 and 101 in electrical connection with the motor 25.

The time between successive experimental tests may be made as long as desired.

In the foregoing it was assumed that the initial direction of adjustment of the valve 18 was in the direction to make reaction conditions better. Obviously, however, the reverse may be true and in this case the initial orienting period will cause the arm 15 to move to the left which makes contact between members 20 and 22, and reverses the motor and the direction of valve adjustment when the nut 52 moves into position to close contact between the members 26 and 27.

The commutator rings 41 and 94 are respectively connected to brushes 102 and 103 of the reversing switch 88. The other brushes 104 and 105 of this switch connect to the terminals 44 and 97 of the motor.

The reversing switch may be of any suitable type, widely different perhaps from that illustrated in Figure 1 and I believe there are already many four-way switches on the market adapted to serve, but for the sake of clearness have in Figure 1 illustrated diagrammatically a form well adapted to serve for the purpose. Its operation is by means of a ratchet and pawl and electromagnet.

When the reversing circuit closes at the end of the initial orienting period the circuit is from the left-hand terminal 54 of the source of current through wire 55 contacts 26 and 27, wires 64 and 65, contacts 20 and 22, wire 106 closed contacts 107 and 108, electrical magnet coil 109 and wires 80 and 81 to the right-hand terminal 82 of the source of current.

Reversing switches 88 and 88' are selective in operation according to the motor in circuit and are illustrated as identical. When the motor 24 is in the circuit, whether to the terminal 44 through winding 110 and wire 43 or to the terminal 97 through winding 111 and wire 96, the current energizes an armature 112 of an electromagnet and closes pivoted contact member 107 against contact member 108.

As soon as the circuit closes through contact members 26 and 27 and wires 64 and 65, to closed contact members 20 and 22 the electromagnet 109 operates a pawl and ratchet 113 and 114 to reverse the electrical connections to the motor 24.

The reversing switch 88 shown comprises a ratchet member 114 adapted to be advanced a tooth at a time by means of a pawl 113 carried upon an arm 115. This arm is normally supported by a stationary stop 116, and carries a soft iron projection 117 beneath the armature of the magnet 109.

The electrical connections 43 and 96 between the switch and the motor are both wound about the armature 112 which is adapted to swing contact member 107 to close electrical connection between the contact 22 at the arm 15 through the electromagnet 109 at the reversing switch to the right-hand terminal 82 of the source of electrical energy.

The respective reversing switches and motors and valve units are precisely similar and the reversing switch is made selective to the motor in circuit by means of the operating switch 107, 108 and electromagnet 112 energized selectively by the motor in operation. The contacts 107 and 108 are closed for the circuit of the motor that is operating and open for the circuit of the motor not operating. This is true irrespective of which direction the motor is running, as the electrical connections to each terminal of the motor operate alike upon the armature 112 to close the switch.

If after the end of the initial orienting period and the closure of contacts 26 and 27 the contact 20 engages with the contact 22 indicating that the motion of the valve had been in a direction opposite to that needed to make things better then the motor at once reverses.

This reversal does not effect any change at the brushes 33 and 34 upon the commutator 23, the brush 34 still maintaining engagement with the commutator contact 39 and current from this contact leaving the commutator at brush 35, which is now due to an advancement of the ratchet wheel 114 in electrical contact with the terminal 97 instead of with the terminal 44 of the motor 24.

The ratchet wheel 114 of the reversing switch carries an annular row of contacts 118; electrically connected to a conducting ring 119 that is in continuous engagement with the brush 104 and an annular row of contacts 120 connected to a conducting ring 121 that is in continuous engagement with the brush 105.

The contacts 118 and 120 alternate, and are so placed with respect to the brushes 102 and 103 that the ratchet wheel in its successive positions alternately places the brush 102 in contact with one of the members 118 while the brush 103 is in contact with one of the members 120 and the brush 102 in contact with one of the members 120 while the brush 103 is in contact with one of the members 118.

The first result from reversing the motor will be that the reaction conditions begin to get better instead of poorer. First the arm 15 will move slightly to the right opening contact between members 20 and 22. This is, however, without effect upon the circuit through the motor. The nut 52 is moving in reversed direction and soon breaks contact between members 26 and 27. It travels reversely until it makes contact between members 26 and 28. Normally this period of reversal will have brought about a change in the direction of deflection of the arm 15 so that normally the arm 15 will have moved to close contact between members 20 and 21 before contact closes between the members 26 and 28.

In this case when the members 26 and 28 engage the arm 83 at the commutator is thrown to the left as already described. The member then continues in reverse direction until the arm 15 ceases to move forward in the desired direction. As soon as the arm 15 moves the least bit backwardly, connection between contacts 20 and 21 breaks and the motor again reverses for a short period as already described.

If for any reason the arm 15 has not after the first reversal started to move in the direction for improving reaction conditions by the time the contacts 26 and 28 close then there will be another reversal but very shortly after this the brush 34 will shut down the motor by reason of running off the contact member 39 so that it would in the latter event leave the valve about where it was initially. This condition might arise if the valve had its best position when the initial orienting period described started.

After the cycle for one motor has been completed the brushes 33 and 34 are guided into position by means of radial projections 98 and 99 to be in proper position for the next cycle which will be upon the succeeding motor.

The operation of the next cycle is precisely like that of the first. The cycle starts with the motor going in a direction that carries the contact member 29 away from the adjacent member 31 or 30 and until contact closes between 29 and the member 30 or 31 the operation of the deflecting arm 15 is wholly without effect upon the motor. If when contacts 29 and 30 close the motor is moving in a direction to make things better the contact 20 will close with contact 21 and the circuit through the magnet 75 will throw the brush arm 83 to the left as already described. This throwing the arm to the left does not reverse the motor but results in the motor circuit including contact members 29 and 30. As soon as things cease to get better the arm 15 moves somewhat to the left opening contacts 20 and 21, which permits the arm 83 to swing somewhat to the right so that the brush 33 engages the commutator 92′ to reverse the motor. This reverse circuit breaks as soon as the nut 53 has moved in reverse direction sufficiently far to break connection between the members 29 and 30, all exactly as already described for the first motor.

It is desirable for each succeeding cycle to operate in a reverse direction from the preceding cycle of the same motor, and for this reason it is preferable to have commutator contact members for two cycles for each motor upon each revolution of the commutator. This is illustrated in Figure 1 where the first and third rows of commutator contacts operate upon the first motor while the second and fourth upon the second motor. The connection, however, of the first row of contacts are relatively reverse to those of the third row and also the connections of the second row are relatively reverse to those of the fourth row. This condition insures that the nut 52 will always move in a direction away from the adjacent contact 28 or 27. Thus if the contact 26 is left near the contact 28 at the end of the preceding cycle then the next motion of the motor will be in a direction to carry contact 26 across the open space to the contact 27 while the reverse is true if the preceding cycle has left the contact 26 near the contact 27.

Figure 2 is given to illustrate the fact that the same position of a valve may at different times be the best position for the valve.

In the two curves 122 and 123 on this figure a desirable condition of the reaction is represented by the ordinates and the abscissas represent the extent of valve opening, so that in the dotted curve the best position for the valve is at the line $a—a$ while in the full line curve the best position is considerably further to the right, at the line $b—b$. It will be noted that an extent of opening which gives a best reaction condition at one time may be one that somewhat later gives a condition of reaction that is very poor.

The scheme of operation shown diagrammatically in Figure 6 is one in which a number of component flows flow to a reaction chamber 150 through inlet conduits 151, 152, 153, 154, 155 and 156 and fluid reaction products leave the reaction chamber through a conduit 157. Within the reaction chamber is shown a boiler 158 adapted to receive liquid through a liquid inlet pipe 159 to be heated by the heat of the reaction within the chamber 150 and to deliver vapor through an outlet pipe 160.

The sizes of the respective component flows are supposed here to be variable, some subject to adjustment and some of them to be perhaps non-adjustable and independently variable. One or more of the flows through the pipes 151, 152, 153, 154, 155 and 156 may be in either direction, although normally the flows will be into the reaction chamber rather than out of the reaction chamber.

Valves 161, 162 and 163 are provided upon the conduits 151, 153 and 155 and are under automatic control of the motors 164, 165 and 166. These motors are in turn under the automatic control of the master differential balance 167 and subordinate balances 168, 169 and 170 in such a way that all of these balances by automatic adjustment of the respective valves keep in step or phase with one another, the subordinate balances deflecting to the same angle as the master balance.

A major balance 171 is connected to deflect responsively to some desirable condition of the reaction, here shown as being to the ratio between a differential measuring the total vapor output from the boiler 158 to a differential measuring total volume of fluid flowing from the reaction chamber 150 through the conduit 157.

In effect the deflection of the major balance is one which corresponds roughly to boiler efficiency here taken as meaning the ratio of boiler output to the total reaction products flowing through the reaction chamber.

The major balance operates successively upon the master and subordinate balances to variantly adjust the relative sizes of the flows through the inlet conduit controlled by the balance under adjustment as compared to the flows through the inlet conduits controlled by the other balances.

The arrangement is in essential very similar to that of Figure 1.

The chief additional feature is in the use of the master and subordinate balances to maintain the component flows relatively proportional to one another while variantly adjusting the proportion.

Master and subordinate balances

The master and subordinate balances are my ratio control balances which as shown may be all substantially alike.

The master balance 167 carries a contact member 172 which cooperates with a pair of contacts 173 and 174 upon each of the subordinate balances. So long as the subordinate balances deflect to the same angle as the master balance the contacts 175 and 176 upon the member 172 do not close with either of the contacts 173 or 174 carried by each subordinate balance.

If, however, one of the subordinate balances, say the balance 168, lags somewhat in its deflection behind the deflection of the master balance then the contacts 175 and 173 close and a motor circuit is closed from the terminal 177 of the source of energy 178 through wire 178 member 172, contacts 175 and 173 and wire 179 to the lower terminal 180 of the motor and thence from the middle terminal 181 of the motor through wire 182 to the upper terminal 183 of the source of energy.

If the balance instead of lagging should lead the master balance then contact is made in the same way through contacts 176 and 174 to the terminal 184 of the motor 164 reversing the motor.

In the one case the valve 161 is opened somewhat by the motor to increase the flow through the inlet conduit 151 and thereby increase the deflection of the subordinate balance 168 and in the second case when the subordinate balance tends to deflect further than the master balance the motor 164 operating in reverse direction shuts down somewhat the valve 161, thereby reducing the flow through the inlet conduit 151 and reducing the deflection of the subordinate balance to bring it again into phase with that of the master balance.

The differential balances used for the master balance 167 and subordinate balances 168, 169 and 170 are shown substantially the same. The differential pressure in each case is transmitted to the upper cylinders 185 and 186 which are rigidly fastened to the downwardly extending pivoted arm 187. This arm is pivoted upon a knife edge 188 supported upon a suitable bearing 189.

The cylinders 185 and 186 are connected together at the bottom through pipe 190 and are partially filled with a sealing liquid 191. The higher pressure is shown as taken from the inlet pipe through pipe 192 flexible connection 193 to the right-hand cylinder 186 and the lower pressure from the reaction chamber through pipes 194 and 195 flexible connection 196 to the left-hand cylinder.

The higher pressure upon a right-hand cylinder forces liquid from the right-hand cylinder to the left-hand cylinder with a corresponding transfer of weight from the right-hand side of the balance to the left-hand side of the balance which tips the balance moving the center of gravity of the balance outwardly from beneath its pivot 188.

When the equilibrium is reached the deflecting moment due to the differential pressure, as above, is balanced by an equal opposing restoring moment due to the weight of the balance and the distance of transfer of its center of gravity outwardly from beneath the pivot, 188.

Preferably the weight of the balance should be as much as possible concentrated far below the pivot 188 in order to make the balance more sensitive.

The need for this is two-fold, in that it reduces both the weight of the balance for given cylinder dimensions and what may be called journal hysteresis at the pivot, which is a lost motion due to lack of sharpness of the knife edge.

The sensitiveness of the balance for a given weight and sharpness of knife edge will be directly proportional to the distance the center of gravity of the balance is below its pivot, as the arm of the restoring moment will vary for a given deflection directly with this distance. Also the sensitiveness of the balance is greater for a given size of cylinders the less its total weight and the total weight is inversely proportional for a given size of cylinders and distance between the cylinders to the distance between the center of gravity of the balance and the pivot, as the restoring moment is to be the same in both cases and the weight must vary inversely with the deflection of the center of gravity outwardly from beneath the pivot.

Each balance is shown weighted far down by means of a container 197 filled with shot or other similar heavy material 198. The container 197 dips into liquid 199 within the vessel 200 and this liquid buoys up the lower end of the balance at the container to an extent dependent upon the depth of immersion of the container within the liquid. Means is provided for varying this depth of immersion to vary restoring moment of each balance for a given deflection.

Reversing motors 201, 202, 203 and 204 are provided each with a worm 205 in connection with a worm wheel 206 threaded upon a rod 207 supporting the liquid container 200. Suitable bearing support 208 is shown for each worm wheel 206.

If a motor turns in one direction it raises the liquid container increasing the depth of immersion of the weighted container 197 and thereby lessening the effective restoring moment of the balance, and if the motor turns in the other direction it operates to lower the liquid container, thereby decreasing the depth of immersion of the weighted container 197 in the liquid 199 and increasing the restoring moment of the balance.

The arrangement is one in which the restoring moment of the master balance 167 and of each of the subordinate balances 168, 169 and 170 is subject to adjustment and this adjustment is effected automatically in response to the operation of the ratio balance 171.

An adjusting screw 209 is shown near the lower end of each arm 210 for adjusting the balances angularly so that angularly they swing in phase, that is all have the same angular deflection.

The operation is essentially the same as that already described in Figure 1 with the exception that the component flows have impressed upon them the additional obligation of keeping in proportion to one another except as modified by the automatic cut and try adjustment.

The commutator shown in fragmentary surface development may be considered as essentially the same as that in Figure 1 but here in view of the fact that there are four component flows under adjustment instead of two there are eight commutator rings instead of the four in Figure 1. Also there will be eight rows of commutator contacts instead of the four shown in Figure 1.

As in Figure 1 each component flow under cut and try automatic adjustment has one pair of commutator rings and two rows of commutator contacts that are relatively in reverse connection with the rings.

Initially as before there is a period when the brushes 33 and 34 engage commutator contacts 39 and 211, contact 39 being in electrical connection through conductor 40, commutator ring 41, selective reversing switch 88 and one or other of the conductors 43 or 96 to the motor terminal 44 or 97 and thence through the middle terminal 45 to the terminal 82 of the source 32 of electrical energy.

This operates the motor in one direction or the other, for the purpose of describing assumed here to be such as to raise the liquid container 200. Each liquid container carries a contact member 212 which is adapted to make contact with either one of the springing contact members 213 and 214 that are connected through wire 65 to the contact member 20 carried by the arm 15 of the ratio balance.

The resilient contacts 213 and 214 are preferably adjustably spaced from one another, and they together form a combined contact member that is the equivalent of the sliding sleeve member 60 of Figure 1, with the exception that inasmuch as the motion is vertical instead of horizontal I show the weight of the sliding contact member counterbalanced.

The springs 213 and 214 are clamped between a strip 215 and the sleeve 216 so that they may be adjusted longitudinally to vary the distance of reverse travel when the motor finally reverses, and adjusted in relative spacing to vary the duration of the periods of orientation. The sleeve 216 slides vertically upon a fixed guiding rod 217 (which is desirably square or non-circular) and is shown counterbalanced over a pulley 218 by a weight 219. During the initial period for orienting purposes changing conditions at the responsive arm 15' of the ratio meter has no effect whatever upon the operating electrical circuit of the motor.

When the orienting period starts the contact member 212 is near but slightly spaced from the contact member 213 or from the contact member 214 of the vertical movable contact member 60'. Assuming that it is initially adjacent the lower member 213, it moves upwardly with the container 200 until it engages the upper contact 214.

All the time the motor is raising the liquid container 200 carrying the contact member 212 the restoring moment of the balance diminishes and as a result the flow corresponding to the maintained deflection of the balance diminishes automatically, by closing down the valve 161 as already described.

If this period of orientation is resulting in a change in the opening of the valve 161 that improves conditions of reaction that is in this case measured by an increased reaction efficiency then the ratio meter 171 will deflect so that its vertical arm moves to the right closing contact between members 20' and 21'.

As soon as the contacts 212 and 214 engage, circuit is closed through the electromagnet 75, from the terminal 54 of the source of energy through wire 55, contact members 212 and 214, wires 64 and 65, contacts 20' and 21', wire 74, magnetic coil 75 and wire 80 to the other terminal 82 of the source of energy. As a result the pivoted link member 83 carrying the brushes 33 and 43 is deflected sharply to the left.

This throws the brush 33 over so as to engage the commutator contact member 85 which is in electrical connection with the ring 41. The brush 34 is now engaging a part of the commutator surface which is electrically insulated but the motor circuit is maintained, from the (upper) terminal 54 of the source 32 of energy through the wire 65 and brush 33, commutator contact member 85, commutator conductor 90, ring 41, wire 42, reversing switch 88 to the same terminal of the motor 201 as before.

The circuit now includes the contacts 212 and 214 but does not include contacts 20 and 21 and the circuit will be broken as soon as an opening is effected between contacts 212 and 214.

The operation of the motor has resulted in improving conditions within the reaction chamber 150 as indicated by an increasing boiler efficiency shown by a motion of the ratio balance to indicate higher efficiency. This adjustment, here a gradual closing of the valve 161 brought about by gradually diminishing the restoring moment of the balance 168, continues until the conditions within the reaction chamber 150 cease to improve.

As soon as reaction conditions cease to improve, or at least very shortly afterward, the balance arm 15' will move reversely, that is to the left opening contact between the members 20' and 21'. This cuts off the current flowing through the magnet 75, permitting the pivoted brush member 83 to swing backwardly (to the left) until the brush 33 engages the contact member 92, which reverses the motor.

The motor now moves to gradually increase the restoring moment of the balance 168 and thereby gradually opens the valve 161, and this opening motion continues until the contact members 212 and 214 separate, a small reverse motion that should preferably be of adjustable length, as already described.

In the foregoing it was assumed that the initial orienting movement of the motor resulted in improved reaction conditions within the chamber 150. However the orienting motion is a cut and try experimental one without any predetermination as to whether conditions will get better or worse by reason of the orienting adjustment.

If reaction conditions get poorer by reason of the orienting motion of the valve, then when contact members 212 and 214 close the arm 15' will have swung to the left closing contact between 20' and 22'. In this event as soon as members 212 and 214 make contact, or as soon thereafter as contact members 20' and 22 make contact, a circuit is closed which reverses the motor.

This reversing circuit is from the terminal 54 of the source 32 of energy through conductor 55, contacts 212 and 214, wire 65, contacts 20' and 22', wire 106, reversing switch 88 and wire 81 to the terminal 82 of the source of energy.

This reversal of the motor circuit is exactly as already described under Figure 1, and results in no change whatever in the position of the brushes 33 and 34.

The motor circuit at this time does not include the contacts at the ratio balance, being from the terminal 54 of the source of the electrical energy, conductor 86, brush 34, commutator contact 39, commutator conductor 40, commutator ring 41, conductor 42, reversing switch 88 to one of the terminals of the motor 201 and from the middle terminal 45 of the motor back to the other terminal 82 of the source of energy.

The ratio balance and the master balance are shown provided with recording mechanisms to give records respectively roughly of the condition of the reaction (as determined by boiler efficiency) and of the common angle of deflection of the balances 167, 168, 169 and 170.

As shown the flows through the inlet conduits 151, 152, 153 and 155 are none of them subject to exact measurement by this common angle of deflection in that the respective balances are variantly adjusted from time to time to bring best reaction conditions within the chamber 150. The periodic adjustment may if desired be omitted from one of the balances, as from the master balance 167 and in this event the record of common angular deflection may be taken as definitely measuring the flows to which the balance is responsive.

Ratio balance

A detailed description of the ratio balance will be found in my U. S. Patent 1,308,626 of July 1, 1919. In general it comprises horizontally spaced cylinders 220 and 221 connected together at the bottom by a pipe 222, which is rigidly carried upon the arm 171 pivoted upon a knife edge 188 with a bearing support at 189.

The weight of the balance is adjusted to make the balance "neutral" with respect to its angle of deflection.

When a balance is neutral it has no tendency toward deflection out of any position within its range of movement except as may be due to a differential pressure impressed upon the upper cylinders.

The effective restoring moment is measured by the product between the angle of deflection, the effective length of the deflected arm, and the differential pressure between the inside and outside of the inverted bell 223 and within the container 224. The lower pressure is within the inverted bell and the suction produces the equivalent of an increased weight equal to that of the liquid pulled up into the bell as indicated in the figure. In figure 6 the upper cylinders 220 and 221 are shown respectively connected to the mouth and throat connections of a venturi 225, the higher pressure from the mouth being transmitted from the pipe 226, flexible connection 193' to the right-hand cylinder 220, forcing the liquid 227 from the right-hand cylinder of the balance to the left-hand cylinder against the lower pressure transmitted from the venturi throat through pipe 228 and flexible connection 229. As a result of this transfer of weight from the right-hand to the left-hand side of the balance the arm 15′ swings to the right until the tipping moment (which is equal to the differential pressure times the distance between the cylinders) is exactly balanced by an equal and opposing restoring moment exerted by the weight of liquid drawn up into the bell 223 by differential pressure transmitted from pipes 194 and 230 respectively from the interior of the reaction chamber 150 to the outside of the bell within the container 224 and from the outlet pipe 157 through pipe 230 into the interior of the bell.

A small slot is shown at 231 to permit deflecting movement of the arm 15′ and this slot may be roughly closed by means of a suitable sliding cover 232 carried by the arm 15′.

The leakage around this cover is readily made so small as compared to the inside area of the pipe 194, that it shall result in no appreciable change in pressure within the container 224. Usually this pressure will be very near to atmospheric and the pipe 194 may be made as large as may be needed to avoid any trouble whatever in making the effect of leakage at this slot negligibly small.

The apparatus shown in Figures 7, 8 and 9 diagrammatically illustrates one form of my invention applied to the automatic control of the air supplied to a furnace to produce the most advantageous gaseous mixture in the furnace.

In accomplishing this result my differential ratio meter, U. S. Patent No. 1,308,626 of July 1, 1919, is connected to act as an improved $CO_2$ meter, as hereinafter explained, or as an improved "boiler efficiency" meter as hereinafter explained. A continuous periodic small and slow fluctuation is impressed on the position of a damper controlling the relative quantities of primary and secondary air, resulting in a continuous and slow periodic fluctuation in furnace conditions and a corresponding fluctuation in the position of the ratio balance. At the end of each periodic small fluctuation of the damper, an electric circuit changes slightly the average position of the damper, the direction of the small change being always such as to improve furnace conditions.

If the ratio balance is used as an improved $CO_2$ meter, furnace conditions automatically gravitate to any desired percentage of $CO_2$ in the flue gas, every periodic adjustment of the damper being in a direction to bring the desired percentage of $CO_2$ in the flue gas.

If the ratio balance is used as a "boiler efficiency" meter, then furnace conditions automatically gravitate to give maximum boiler efficiency.

In diagrammatic Figure 7 the ratio meter is connected as a $CO_2$ meter.

In this figure a fan A delivers a continuous stream of flue gas into the pipe $A_1$ at atmospheric pressure, the percentage of $CO_2$ in this flue gas being affected by the position of the damper $P_5$ controlling the relative quantities of primary and secondary air admitted to a furnace. A second fan, B, draws a small continuous supply of the flue gas from the pipe $A_1$ successively through a coil $B_1$ surrounded by a caustic solution $C_1$ within a chamber C, through a small orifice $B_2$, through a pipe $B_3$ delivering into the caustic $C_1$, in small bubbles through the caustic solution $C_1$ and through a pipe $B_4$ and a second small orifice $B_5$. The $CO_2$ of the continuous sample drawn by the fan B from the pipe $A_1$ is absorbed in the caustic solution $C_1$ and the ratio of the fall in pressure at the second small orifice $B_5$ to the fall in pressure at the first small orifice $B_2$ is a function of the percentage of $CO_2$ absorbed at $C_1$ so that a continuous record of this ratio (by the ratio recorder) on a suitable scale $D16$, will be a record of $CO_2$ in the flue gas.

The differential pressure at the orifice $B_5$ is transmitted by means of the pressure connections $E_1$ and $E_2$ to the cylinders $D_1$ and $D_2$ of the ratio meter D, exerting a tilting moment, as described in specification of U. S. Patent No. 1,308,626, of July 1, 1919, proportional to the impressed differential from the orifice $B_5$. The differential or drop in pressure at the small orifice $B_2$ is equal to the suction or pressure below atmosphere after the orifice $B_2$ as transmitted by the pressure connection $E_3$ to the space above the liquid beneath the bell or inverted cup shaped receptacle $D_3$ of the ratio meter D, for the pressure before the orifice $B_2$ is sensibly atmospheric, the fan A discharging to atmosphere through a sufficiently large pipe $A_1$ and the bore of the pipe and coil $B_1$ being sufficiently large as compared with the size of the orifice $B_2$.

The ratio meter D comprises a U tube $D_1 D_4 D_2$ with flexible connections $D_5$ and $D_6$ rigidly fastened to a vertical arm $D_7$ pivoted at $D_8$ upon fixed bearing $D_{17}$ having rigidly attached to it at its lower end a bell or inverted cup-shaped receptable $D_3$ dipping into water or other liquid in a suitable stationary receptacle $D_9$ and having a screw counterweight $D_{10}$ near the lower end of the vertical arm $D_7$; and having a suitable recording or indicating mechanism $D_{11}$.

As explained in U. S. Patent No. 1,308,626, the pivoted member $D_1 D_2 D_7 D_3$ is sensibly neutral when there is zero differential at the cylinders $D_1$ and $D_2$ and zero gauge pressure above the liquid beneath the bell $D_3$, that is, will exert of itself no sensible tendency to move to any particular position within its usual range of motion.

This condition of neutrality of the balance with respect to its angular position has been described in detail in the patent referred to. It is obtained by so relating dimensions and weights of the different parts of the balance that flow of water (or other sealing liquid) between the cylinders $D_1$ and $D_2$ by reason of merely tipping the balance does not affect the equilibrium of the balance, in that the transfer of weight from one cylinder to the other results in a change in the turning or deflecting moment just balanced by a corresponding opposing change in the restoring moment from the shifting of the center of gravity of the balance, incident to the tipping.

In operation the deflecting moment is proportional to the differential pressure transmitted from the small orifice $B_5$ to the cylinders $D_1$ and $D_2$, and the restoring moment resisting deflection is simultaneously proportional to the deflection and to the suction under $D_3$ from the small orifice $B_2$, that is proportional to the product of the deflection by the suction under $D_3$.

The balance angularly deflects or turns upon its pivot to positions of equilibrium under the combined influences of the deflecting moment and of the restoring moment.

The deflecting moment, in view of the neutrality of the balance with respect to its position, is that impressed upon the upper cylinders, $D_1$ and $D_2$, by the differential pressure from the orifice $B_5$, and is directly proportional to this differential pressure and independent of the degree of deflection.

The restoring moment, that tending to return the balance to its mid position, is due to the suction beneath the bell $D_3$ from the orifice $B_2$ and is a direct function of the degree of suction and of the degree of deflection from mid position in that the arm of the restoring moment varies directly with the deflection from mid position.

The balance is normally in substantial equilibrium, the restoring moment, except for the slight lag, maintaining equality with the deflecting moment, so that algebraically $M_1 = M_2$; $M_1 = KH$; $M_2 = K'H'f$; whence $KH = K'H'f$; $f = (K/K')(H/H')$, or $f = K''(H/H') = K''R'$. In these expressions $M_1$ and $M_2$ are the deflecting and restoring moments respectively, $K$, $K'$ and $K''$ are constants, $H$ and $H'$ are the impressed differentials toward deflection and restoration respectively, $R$ is the ratio $H/H'$ between these differentials, and $f$ is the degree of deflection of the balance from its zero position.

The deflection of the balance is thus proportional to the ratio between the differential pressures transmitted from the orifices $B_5$ and $B_2$ which ratio is a function of the percentage of $CO_2$ in the stream of flue gas passing to the absorption chamber C, in that these differentials measure the same stream of flue gas with and without its $CO_2$, so that the deflection of the balance is a dependent function of the $CO_2$.

In adjusting the balance so that it may indicate $CO_2$ on a suitable chart or scale, $D_{16}$, a blank is run with $CO_2$-free air and the adjusting counter-weight $D_{10}$ is screwed to the right or left until the pen $D_{11}$ indicates zero $CO_2$ on the scale of the chart.

The cylinders $D_1$ and $D_2$ are now by-passed making zero differential between these cylinders, the suction in the bell $D_3$ remaining unchanged. The adjusting counter-weight $D_{10}$ is now screwed to the right or left until the pen $D_{11}$ again reads zero $CO_2$ on the chart, careful note being made of the number of turns and fraction of a turn through which the counter-weight $D_{10}$ must be moved to accomplish this result.

With 20% $CO_2$ the ratio between the differentials at $B_5$ and $B_2$ will be 0.58 as great as when there is zero $CO_2$, supposing the other gas present to be air or to have the density of air, as is sensibly true with ordinary flue gas.

The counter-weight $D_{10}$ is now screwed back 0.42 (or 1.00 minus 0.58) of the number of turns that were required to bring the pen again to zero after by-passing the cylinders. The pen should now indicate 20% if the balance is in correct calibration, and if it does not indicate 20% $CO_2$, then the quantity of water in the stationary receptacle $D_9$ is altered until the pen does indicate 20% $CO_2$, after which the apparatus should be in correct calibration for recording $CO_2$ in the flue gas, the counter-weight $D_{10}$ being put back to its position for zero indication on a blank run of $CO_2$-free air.

Changing the quantity of liquid in the stationary receptacle $D_9$ changes the effective length of the arm of the moment exerted by the differential from the orifice $B_2$. In practice this adjustment of the quantity of liquid in the stationary receptacle $D_9$ should be within rather narrow limits, being merely such as is necessary to care for inexactness in duplication of dimensions of the ratio meter and of the orifices $B_2$ and $B_5$.

The ratio balance is responsive to variation in the ratio of the differential pressure across the small orifice $B_5$ to the suction under the bell $D_3$ and there may be wide change in the individual magnitudes of the differential and suction without any change whatever in the reading of the balance provided the ratio between them does not change.

In the arrangement of Figure 7 the suction under the bell will usually remain fairly constant by reason of the preferably fairly constant speed of the fan B; it will however vary somewhat with variation in the $CO_2$ content of the gas and also gradually change somewhat by reason of gradual change in the absorbing medium within the chamber C. Such variation in the suction does not however, either practically or theoretically, have any effect upon the indications of the balance.

If $CO_2$ is to be used to adjust air supply it is essential that there shall not be material lag between the condition in the flue or furnace and the indication of the recorder. A common fault with $CO_2$ recorders is a lag of magnitude too great to permit their use in any automatic control of air supply. In my improved apparatus lag is made extremely small by placing the fan A close to the absorption chamber, by making the piping between the fan A and the orifice $B_5$ of small bore and relatively short, and by making the absorption chamber C at the top taper to the pipe $B_4$ so that the volume of gas within the chamber may be very small, and a few seconds may suffice to bring a sample of flue gas from the flue to and through the absorption apparatus.

In practice the fans A and B may conveniently be on the same shaft.

The temperature of the flue gas should be the same at the orifice $B_2$ and at the orifice $B_5$ and to bring this about the coil $B_1$ is conveniently placed within the caustic chamber C, as in the figure.

An electric contact member F is adjustably attached to, and electrically insulated from, the vertical arm $D_7$ of the ratio meter at $F_2$, and has an arm $F_1$ passing downward through a vertical slot in a pivoted contact member G (see enlarged perspective detail, Fig. 8), G comprising upper and lower horizontal metal plates $G_1$ and $G_2$ and a vertical pivot $G_3$ electrically insulated from one another, the walls of the vertical slot affording electric contact between $G_1$ and $F_1$ at the top or between $G_2$ and $F_1$ at the bottom. The pivot member G is provided with suitable bearings $G_4$; the insulation between the plates $G_1$ and $G_2$ is shown at $G_5$ and the insulation between the pivot and the plates at $G_6$.

Deflection of the ratio balance impresses deflection on the contact member G by reason of the electric contact arm $F_1$ pressing against one side of the vertical slot through G. If the arm $F_1$ is inclined forward from the bottom upward then forward deflection of the ratio balance will give contact between $F_1$ and $G_1$ and backward deflection of the ratio balance will contact between $F_1$ and $G_2$ and vice versa, if the arm $F_1$ is inclined backward from the bottom up then forward deflection of the ratio balance will result in contact between $F_1$ and $G_2$ and backward deflection of the ratio balance will result in contact between $F_1$ and $G_1$.

The inclination of the arm $F_1$ varies with the position of the ratio balance as with the balance it deflects about the pivot $D_8$. The arm $F_1$ may be set vertical at any desired position of the ratio balance, as for example that corresponding to 14% $CO_2$ and if after thus having set F vertical at this position, the balance is deflected forward, then $F_1$ becomes inclined backward from the bottom up and any forward deflection is accompanied by contact between $F_1$ and $G_2$ and deflection back accompanied by contact between $F_1$ and $G_1$ until the vertical position for $F_1$ is passed after which $F_1$ is inclined the other way and in going backward electric contact will be between $F_1$ and $G_2$; and on returning toward the position in which $F_1$ is vertical contact will be between $F_1$ and $G_2$.

A damper or distributing valve $P_4$ controlling the relative quantities of primary and secondary air to a furnace is connected as by means of a chain or rope $H_1$ to a float $H_2$ in such a way that the vertical height of the float $H_2$ determines the position of the damper. The float member $H_2$ floats within a float receptacle $H_3$ floating in a larger and fixed receptacle $H_4$.

$P_1$ is the air supply conduit for supplying the total air for combustion in the furnace under control. The furnace itself is not shown being in no way a direct part of my invention.

The supply conduit $P_1$ divides into distributing branches $P_2$ and $P_3$ for distributing the air to different parts of the furnace, these branches carrying respectively for example primary and secondary air.

Primary air is that entering the furnace through the incandescent fuel and reacts with the fuel to give combustion-products that are incompletely burned, and secondary air is that added after the first reaction to complete the combustion.

$P_4$ is a distributor or valve of distribution for controlling the distribution or relative quantities of air supplied through the branches $P_2$ and $P_3$, and has a port $P_5$ opening partly across both branches and the respective inlet areas into the branches is determined by the height of this valve so that by varying the height all or none or any desired portion of the total air may be directed to either branch.

The air distributor $P_4$ which thus controls the air distribution to the furnace, as for example the relative quantities of primary and secondary air, is operatively connected, as by means of a chain or wire $H_1$ over pulleys $H_5$, to the float $H_2$, so that the height of this float determines the air distribution to the furnace, that is determines the relative quantities of air through the branches $P_2$ and $P_3$.

In usual operation constant water pressure is supplied to the pipe $I_1$ before the valve $J_1$, $J_1$ being controlled by the motor K. The valve $J_2$ is closed and the valve $J_3$ is open, the pipe $I_3$ being of small bore so that even when the valve $J_3$ is open wide water discharge is throttled at the pipe $I_3$, causing a head of water in the receptacle $H_4$, the depth of this water depending on the quantity of water that must pass through the pipe $I_3$, as determined by the extent to which valve $J_1$ is open. The average height of the float $H_2$ depends upon this depth of water in the receptacle $H_4$, that is, upon the extent to which the valve $J_1$ is open. There is a continual intermittent rise and fall impressed on the float $H_2$, a small hole in the bottom of the float receptacle $H_3$ permitting this receptacle to gradually fill with water until an intermittent syphon $I_4$ overflows, when the water in the receptacle $H_3$ is quickly lowered, the water discharging through the flexible pipe $I_5$ into the waste pipe $I_6$, only again to gradually fill and quickly discharge, the operation of repeated gradual rise and fairly rapid fall being thus kept up continuously and automatically, irrespective of the depth of water in $H_4$.

When the float $H_2$ is at the end of its gradual rise an electric circuit closes at L, the circuit being from the source of current M to L, through the conducting wire $L_1$ to the contact member F on the ratio balance, thence to $G_1$ or $G_2$ and the corresponding conducting wires $L_2$ or $L_3$ to the motor K controlling the water to the receptacle $H_4$.

The motor K, by controlling the opening and closure of the supply valve $J_1$ operates to increase or to diminish the head of water in the receptacle $H_4$ according as the circuit is through $G_2$ or $G_1$. Thus, suppose the arm $F_1$ of the ratio balance is adjusted so that it is vertical when the ratio balance is in the position corresponding to 14% $CO_2$. Suppose the $CO_2$ in the flue gas to average about 10% and that when the circuit temporarily closes at L after the slow rise of the float $H_2$ the $CO_2$ in the flue gas, by reason of this gradual rise, is increasing in the flue gas causing the balance to move toward 14%, the actual reading however being perhaps 10%. The arm $F_1$ will then slope in such a way as to make the contact with $G_1$, causing the motor K to slightly turn the valve $J_1$ in such a way as to increase the head of water in the receptacle $H_4$, thus changing the average height of the float $H_2$ in such direction as would result in greater percentage of $CO_2$ in the flue gas. If, on the other hand, the gradual rise of the float $H_2$ had resulted in a gradual fall in the percentage of $CO_2$, then electric contact would have been through $F_1$ to $G_2$ and the motor K would partially close the valve $J_1$ diminishing the average height of the float $H_2$ but changing this average height in the proper direction to result in an increase in the $CO_2$ in the flue gas.

The arrangement is one in which every periodic adjustment of the valve $J_1$ by the motor K is in such direction as will result in an increase in percentage of $CO_2$ in the flue gas as long as this percentage is below 14%, and in direction such as will result in lower $CO_2$ whenever the percentage of $CO_2$ in the flue already exceeds 14%.

If it is desired at any time to quickly lower the float $H_2$ so as to quickly change the position of the damper controlling the relative quantities of primary and secondary air to the furnace, all that is necessary is to open the valve $J_2$ which will quickly empty the receptacle $H_4$; or if it is desired to quickly raise the float $H_2$ beyond its normal position, all that is necessary is to close the valve $J_3$ when the receptacle $H_4$ will fill with water to any desired height.

In practice it is sometimes convenient in order to obtain closer regulation at the valve $J_1$ to by-pass this valve with part of the flow to the pipe $I_2$, there being a suitable hand-valve in this by-pass.

The arrangement is one in which periodic adjustments are made to the damper, every adjustment being in such direction as will tend to bring about any desired percentage of $CO_2$ in the flue gas.

When operated as a boiler efficiency meter, the ratio meter measures a ratio that is roughly a measure of boiler efficiency and that is maximum when boiler efficiency is maximum.

In practice this ratio is conveniently that between a differential created by and measuring total steam output from the boiler and a differential created by and roughly measuring the total gaseous products of combustion flowing through the furnace of the boiler, these two differentials being conveniently respectively the differential pressure at a disk orifice in the steam pipe from the boiler and the differential flue gas pressure across the boiler. However, these differentials might be any so related to one another and to boiler efficiency as to be in maximum ratio with maximum boiler efficiency.

The ratio measured by the ratio meter need not be, and usually is not, strictly speaking, a measure of boiler efficiency, but always it is increased by any increase in boiler efficiency, and in my control apparatus this ratio is made to gravitate automatically to a maximum by reason of small automatic periodic adjustments in the position of an air distributor, each small periodic adjustment of the damper or distributor being in such direction as to tend to increase the indication of the ratio meter and therefore in such direction as to bring better conditions of combustion within the furnace.

Referring to Fig. 9 representing the ratio meter as a "boiler efficiency" meter, the arrangement for the automatic control of the damper is not shown, being essentially the same as in Fig. 7, there being automatic periodic adjustment of the damper, each adjustment being in such direction as will tend to increase the ratio of heat output from the boiler to furnace input, that is to increase boiler efficiency. As all damper adjustments are to be such as will tend to make the balance gravitate in only one direction, that is toward a maximum, instead of toward some desired specific value, as with the balance connected as a $CO_2$ meter, the contact member G may conveniently be somewhat simplified, in that contact members $G_1$ and $G_2$ need each afford contact surface with $F_1$ (see Figure 7) on only one side of the slot through G, contacts with $G_1$ and $G_2$ being respectively on opposite sides of the slot through G.

In view of the flue gas pressure before the boiler usually differing somewhat from atmospheric pressure it is necessary to have a different arrangement from that in Fig. 1 at the bell or inverted cup-shaped receptacle $D_3$. The bell $D_3$ hangs by a metal ribbon $D_{14}$ and is pivoted at a knife edge $D_{15}$ at the lower end of the vertical arm $D_7$. The stationary receptacle $D_9$ is covered by a lid $D_{12}$ with a narrow slot $D_{13}$ through which passes the metal ribbon $D_{14}$ suspending the bell $D_3$. This narrow slot $D_{13}$ is of a size just sufficient to permit the thin metal ribbon $D_{14}$ to deflect through its proper range of motion without touching the walls of the slot $D_{13}$. The pressure pipe $E_4$ gives pressure connection between the flue gas before it reaches the boiler and the space within $D_9$ above the bell $D_3$, and the size of this pressure pipe $E_4$ is relatively large as compared to the size of the clearance space through the lid $D_{12}$ at $D_{13}$ around the thin metal ribbon $D_{14}$, so that there is sensibly the same pressure in $D_9$ above the bell $D_3$ as in the flue gas before the boiler. The pipe $E_3$ gives pressure connection to the flue gas after it passes the boiler.

In all the forms shown I provide for a change in the relative sizes of subsequently inter-reacting component flows and automatically use the resultant change in a condition of the inter-reaction produced to orient an adjustment in the relative sizes of the flows. In all of the forms shown the adjustment is made by means of an automatically oriented instrument responsive to a condition of the reaction.

In Figure 7 I show a single damper-valve controlling the relative sizes of component flows there being here but two component flows illustrated, while in the forms of Figures 1 and 6 the individual component flows are controlled by individual valves which are subjected to adjustment by an instrument periodically and automatically oriented for the purpose.

In the form of Figure 7 the orienting change in the position of a damper is one of reciprocation independent of subsequent adjustment and is shown as produced by means of a float reciprocating under the action of an intermittent syphon while in the other forms the orienting change is in one direction and tied up with the subsequent adjustment. It is produced by the aid of a commutator driven by clock or other motor.

The form illustrated in Figure 6 is particularly advantageous as compared to that of Figure 1 where there are many component flows with not all of them adapted to be adjusted. Those that are open to adjustment are maintained variantly proportional that is any outside change upon one of the component flows open to adjustment will be automatically accompanied by corresponding changes in the other flows open to adjustment.

It is obvious that the forms shown may be widely modified without departing from the principles disclosed and that in view of my disclosure others skilled in the art may see many variations and modifications, all of which I claim in so far as they fall within the reasonable spirit and scope of my invention.

Having thus described my invention what I claim as new and desire to secure by Letters Patent is:

1. In the art of combustion control, in controlling the size of one or more component streams to advantageously affect an inter-reaction between the streams after they flow together, the method which consists in making an orienting experimental change in the size of one of the streams, and in using a resultant change in the reaction to automatically effect a permanent adjustment in the size of the stream to improve a condition of the reaction.

2. In the art of combustion control, in controlling the size of one or more component streams to advantageously affect an inter-reaction between the streams after they flow together, the method which consists in making an orienting experimental change in the size of one of the streams, and in using a resultant change in the reaction to automatically effect a slow permanent adjustment in the size of the stream in order to improve a condition of the reaction, making the permanent adjustment in one direction until the reaction conditions cease to improve.

3. In the art of combustion control, in controlling the size of one or more component streams to advantageously affect an inter-reaction between the streams after they flow together, the method which consists in making an orienting experimental change in the size of one of the streams, in using a resultant change in the reaction to effect a slow permanent adjustment in the size of the stream to improve a condition of the reaction, slowly making the permanent adjustment automatically in one direction until the reaction condition ceases to improve, and in making a small reverse adjustment automatically to correct overtravel.

4. In the art of combustion control, in controlling the size of one or more component streams to advantageously affect an inter-reaction between the streams after they flow together, the method which consists in making an orienting experimental change in the size of one of the streams, in using a resultant change in the reaction to automatically effect a slow permanent adjustment in the size of the stream to improve a condition of the reaction, and in repeating the cycle at periodic intervals.

5. In the art of combustion control, in controlling the size of one or more component streams to advantageously affect an inter-reaction between the streams after they flow together, the method which consists in making an experimental change in the size of one of the streams, in using the direction of a resultant change in the reaction to automatically determine the direction for a permanent adjustment in the size of the stream to improve conditions of the reaction, in slowly and automatically making the permanent adjustment in the direction indicated until the reaction conditions cease to improve and in repeating the cycle at periodic intervals.

6. In the art of combustion control, in controlling the size of one or more component streams to advantageously affect an inter-reaction between the streams after they flow together, the method which consists in making an experimental change in the size of one of the streams, in using the direction of a resultant change in the reaction to automatically determine the direction for a permanent adjustment in the size of the stream to improve conditions of the reaction, in automatically slowly making the permanent adjustment in the direction indicated until the reaction conditions cease to improve, in making a small reverse adjustment to correct overtravel, and in repeating the cycle at periodic intervals.

7. In the art of combustion control, in controlling a continuing reaction resulting from the union of a number of component flows, a step which consists in changing the size of one of the flows, and in using the direction of a resultant change in a condition of the reaction to automatically determine the direction for a permanent adjustment of the flow first operated upon.

8. In the art of combustion control, in controlling a continuing reaction resulting from the union of a number of component flows, the method which consists in changing the size of one of the flows, in using the direction of a resultant change in a condition of the reaction to automatically determine the direction for a permanent adjustment of the flow first operated upon, in automatically making an adjustment of the size of the first flow in the direction indicated and after the lapse of a predetermined interval in operating in the same way upon one of the other flows and in successively at periodic intervals repeating the cycle upon different streams.

9. In the art of combustion control, in regulating automatically for better reaction the relative sizes of two component streams that flow together to inter-react by using a valve and differential balance, the method which consists in determining the deflection of the balance by one flow, in determining the tipping moment upon the balance by the other flow, in determining the second flow by the deflection of the balance, and in using a condition of the reaction to vary the restoring moment upon the balance.

10. In the art of combustion control, a step in the method of using a differential balance for automatic regulation of an inter-reaction between component streams that flow together to inter-react, which consists in using a differential pressure that is responsive to the magnitude of one of the streams to impress a deflecting moment upon the balance and in using a condition of the reaction to variably control the restoring moment upon the balance, in order to variably control the ratio between deflection of the balance and the differential pressure that produces the deflection.

11. In the art of combustion control, in variantly adjusting a valve to secure a more advantageous condition in a reaction that is variantly responsive to the valve position, the method which consists in moving the valve, in using a resultant change in the reaction to automatically adjust the valve, and in periodically repeating the operation.

12. A step in the method of adjusting the relative proportions of total flow controlled by a number of individual flow balances having vertical arms and deflecting in agreement with one another responsively to adjustments of one of the individual flows which consists in partially immersing one of the arms in liquid and in adjusting the depths of immersion.

13. In the art of combustion control, in apparatus for flow regulation, a differential balance, a conduit adapted to carry a flow producing differential pressure, connections adapted to transmit the differential pressure produced by the flow to the balance, other connections adapting the balance to adjust the flow when abnormally deflected and means for automatically adjusting the restoring moment of the balance responsive to a condition affected by a variation in the magnitude of the flow.

14. In the art of combustion control, a guide, a slide thereon neutral as to position along the guide, adjustably spaced contacts on the slide, a third contact adapted to movement between the first contacts and to engage either of them, a valve, a reversible motor adapted to adjust the valve and to move the third contact to engage one of the first contacts when moving in one direction and to engage the other of the first contacts when moving in the other direction, a fourth contact electrically connected with the first contacts and adapted to deflect responsively to variation in the position of the valve, and electrical connections adapting the motor to simultaneously move the valve and move the third contact across the adjustable space between the first and second contacts and to be directionally controlled for a period thereafter by the direction of changing deflection of the fourth contact.

15. In the art of combustion control, a guide, a slide contact member thereon neutral as to its position along the guide and having a recess, abutments spaced from the recess upon opposite sides thereof, a second contact member adapted to movement across the recess to make engagement with the slide contact at each side of the recess and to movement in either direction beyond the recess along the slide in engagement with the slide to the abutment and then to further movement by moving the slide with it, a valve, a reversible motor adapted to simultaneously move the valve and the second contact, a third contact electrically connected to the slide contact member and adapted to deflect responsively to variation in the position of the valve, and electrical connections adapting the motor to simultaneously move the valve and to move the second contact across the recess to sliding engagement with the slide to engagement with one of the abutments and to be reversed by the third contact.

16. In the art of combustion control, a guide, a slide contact member thereon neutral as to its position along the guide and having a recess, abutments adjustably spaced from the recess upon opposite sides thereof, a second contact member adapted to movement across the recess to make engagement with the slide contact at each side of the recess and to movement in either direction beyond the recess along the slide in engagement with the slide to the abutment and then to further movement by moving the slide with it, a valve, a reversible motor adapted to simultaneously move the valve and the second contact, a third contact electrically connected to the slide contact member and adapted to deflect responsively to variation in the position of the valve, and electrical connections adapting the motor to simultaneously move the valve and to move the second contact member across the recess to sliding engagement with the slide to engagement with one of the abutments and to be reversed by the third contact.

17. In the art of combustion control, the combination of master and subordinate differential balances deflecting substantially proportionally to their respective applied differential pressures and maintaining proportionality between a number of flows, with reaction responsive means varying the restoring moments of the individual subordinate balances to effect adjustments in the individual proportions of total flow controlled by the respective balances.

18. In the art of combustion control, in apparatus for regulating automatically for better inter-reaction the relative sizes of a number of component streams that flow together to inter-react, a reaction chamber, a plurality of inlet conduits for component flows thereto, an outlet conduit for passage of the products of the inter-reaction, a major instrument deflecting responsively to a condition of the reaction, a plurality of differential balances connected to receive differential pressures produced by the respective component flows, electrical and valve connections between one of the balances and one or more of the others adapting the balances to deflect in unison by reason of adjustment of the flows to which the balances are respectively responsive and an adjustment between the major instrument and the balances adapted to selectively adjust the restoring moments of the balances.

19. In the art of combustion control, in apparatus for automatically controlling an inter-reaction between two or more component flows that flow together to inter-react, a deflecting differential balance having restoring and deflecting moments, and mechanism adapting one of the component flows to determine the angular deflection of the balance, another of the component flows to determine its deflecting moment, and the inter-reaction simultaneously with the deflection to determine the restoring moment of the balance.

20. In the art of combustion control, in apparatus for automatically controlling a reaction between two or more component streams that flow together to inter-react, means deflecting responsively to the reaction, a differential balance, connections thereto from one of the component flows adapting said flow to determine the tipping moment upon the balance, inter-connections between a second component flow and the balance and the first flow adapting the second flow to determine the angular deflection of the balance by adjustment of the first flow and a control between the means and the restoring moment of the balance.

WILLIAM J. CROWELL, Jr.